(12) United States Patent
Liu et al.

(10) Patent No.: US 12,379,982 B2
(45) Date of Patent: Aug. 5, 2025

(54) METHODS AND APPARATUS FOR RUNTIME RECOVERY OF PROCESSOR LINKS

(71) Applicant: Intel Corporation, Santa Clara, CA (US)

(72) Inventors: Shijie Liu, Shanghai (CN); Tao Xu, Shanghai (CN); Lei Zhu, Shanghai (CN); Kevin Yufu Li, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/570,493

(22) PCT Filed: Sep. 24, 2021

(86) PCT No.: PCT/CN2021/120220
§ 371 (c)(1),
(2) Date: Dec. 14, 2023

(87) PCT Pub. No.: WO2023/044725
PCT Pub. Date: Mar. 30, 2023

(65) Prior Publication Data
US 2024/0281315 A1    Aug. 22, 2024

(51) Int. Cl.
*G06F 11/07* (2006.01)

(52) U.S. Cl.
CPC ........ *G06F 11/076* (2013.01); *G06F 11/0745* (2013.01); *G06F 11/0793* (2013.01)

(58) Field of Classification Search
CPC ............. G06F 11/0721; G06F 11/0745; G06F 11/0754; G06F 11/0757; G06F 11/076;
(Continued)

(56) References Cited

U.S. PATENT DOCUMENTS

| 2012/0079312 A1* | 3/2012 | Muthrasanallur ... G06F 11/0793 714/E11.023 |
| 2013/0103927 A1* | 4/2013 | Berry, Jr. ............ G06F 9/30007 712/30 |

(Continued)

FOREIGN PATENT DOCUMENTS

| CN | 106656588 A | 5/2017 |
| CN | 109818877 A | 5/2019 |
| CN | 113177018 A | 7/2021 |

OTHER PUBLICATIONS

International Searching Authority, "International Search Report," issued in connection with International Patent Application No. PCT/CN2021/120220, dated Apr. 25, 2022, 3 pages.
(Continued)

*Primary Examiner* — Gabriel Chu
(74) *Attorney, Agent, or Firm* — HANLEY, FLIGHT & ZIMMERMAN, LLC

(57) ABSTRACT

Methods, apparatus, systems, and articles of manufacture are disclosed that perform runtime recovery of processor links. An example non-transitory computer readable medium comprises instructions that, when executed, causes a machine to at least determine an onset of an error based on health of a central processor unit (CPU) port, calculate a figure of merit (FOM) yield for each of a plurality of adaptation tasks performed on a lane of the CPU port using a first preset coefficient of a plurality of preset coefficients, select a preset coefficient based on the calculated FOM, and trigger a link recovery mechanism, using the selected preset coefficient to initiate a link recovery process on the CPU port.

20 Claims, 11 Drawing Sheets

(58) Field of Classification Search
CPC .............. G06F 11/0793; G06F 11/221; G06F 11/2236; G06F 11/3024; G06F 11/3027; G06F 11/3041; G06F 11/3485; G06F 11/349

See application file for complete search history.

(56) References Cited

U.S. PATENT DOCUMENTS

| | | | |
|---|---|---|---|
| 2015/0074466 A1* | 3/2015 | Adar .................. | G06F 11/2007 714/43 |
| 2016/0092335 A1* | 3/2016 | Boelter .................. | G06F 13/00 714/47.1 |
| 2020/0228197 A1 | 7/2020 | Bhatnagar et al. | |
| 2020/0341927 A1* | 10/2020 | Luong ................. | G06F 13/4027 |

OTHER PUBLICATIONS

International Searching Authority, "Written Opinion of the International Searching Authority," issued in connection with International Patent Application No. PCT/CN2021/120220, dated Apr. 25, 2022, 4 pages.

* cited by examiner

METHODS AND APPARATUS FOR RUNTIME RECOVERY OF PROCESSOR LINKS

RELATED APPLICATION

This patent arises from a US National Stage of International Application No. PCT/CN2021/120220, filed Sep. 24, 2021, and entitled "METHODS AND APPARATUS FOR RUNTIME RECOVERY OF PROCESSOR LINKS." Priority to International Application No. PCT/CN2021/120220 is hereby claimed. International Application No. PCT/CN2021/120220 is hereby incorporated by reference in its entirety.

FIELD OF THE DISCLOSURE

This disclosure relates generally to processing devices and, more particularly, to methods and apparatus for runtime recovery of processor links.

BACKGROUND

In current x86-based, multi-socketed Central Processing Unit (CPU) platforms, the plurality of sockets are connected via a set of links. Generally, each CPU will have several ports that are each associated with at least one port of another CPU, and these links serve as communication channels for transactions between the CPUs. When one of these links starts to encounter performance trouble (e.g., link width and/or speed degradation, correctable errors (CE), etc.), the probability of an impending uncorrectable error (UCE) increases.

Figure 1:
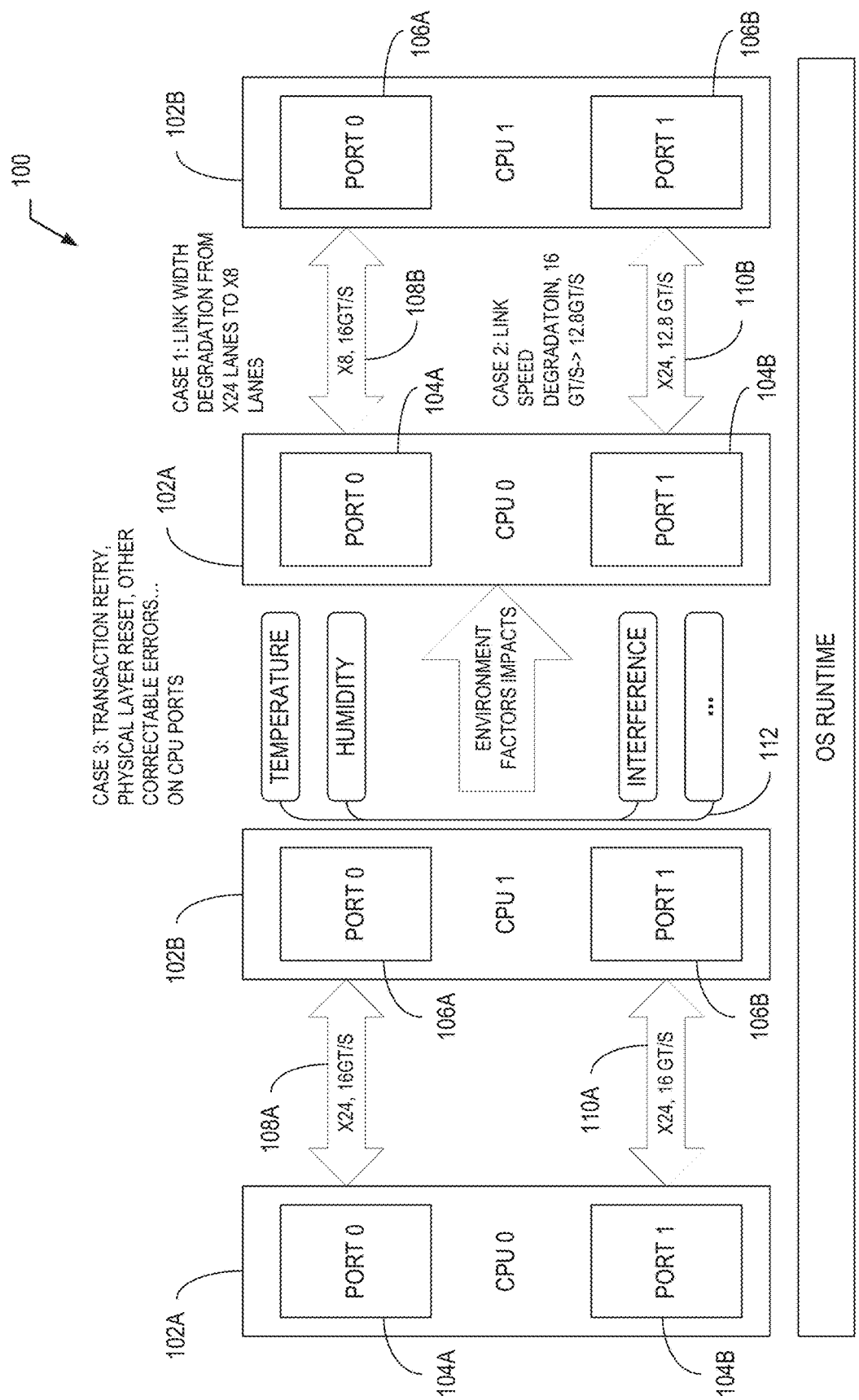
FIG. 1 is a depiction of a set of example system performance drop cases which may cause uncorrectable errors (UCEs) on CPU ports.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

When a CPU port encounters a failed link as a result of an uncorrectable error (UCE), any incomplete transactions are unable to be finished. If an unfinished transaction is deemed critical (i.e., it cannot be ignored by the source), the system will crash, resulting in a potential loss of important data and a need for a system restart to regain functionality.

Current approaches to perform link recovery on failed and/or failing CPU links require a full platform reset and cannot be performed during runtime, causing a major inconvenience to the user whenever an uncorrectable error is encountered.

Example methods and apparatus disclosed herein monitor CPU port performance, predict impending UCEs, and trigger the link recovery system during runtime to avoid system crashes, platform resets, and/or performance drops. Having the ability to perform link recovery on failed and/or failing CPU links without a full platform reset allows for the more efficient and reliable completion of transactions between CPUs without fear of sudden data loss as a result of a UCE. Examples disclosed herein utilize CPU link recovery methods such as Peripheral Component Interconnect Express link training (hereafter referred to as "PCIe link training"), BIOS System Management Interrupts (SMI), etc. In examples disclosed, Transmit Equalization Adaptation may hereafter be referred to as "TX EQ Adaptation."

FIG. 1 depicts a set of example system performance drop cases which may cause uncorrectable errors (UCEs) on CPU ports. An example set of links, 108A and 110A, are illustrated between the first and second ports 104A, 104B, 106A, and 106B, respectively, of a first and second CPU, 102A and 102B. Environmental factors 112 present a first case of system performance degradation that results in cumulative correctable errors (CEs) such as transaction retry, physical layer reset, etc. An example link width degradation from 24 to 8 lanes is illustrated on links 108B as a second case of system performance degradation, and an example link speed degradation from 16 gigatransfers/second to 12 gigatransfers/second is shown on links 110B as a third case of a system performance drop that may result in a UCE.

Figure 2:
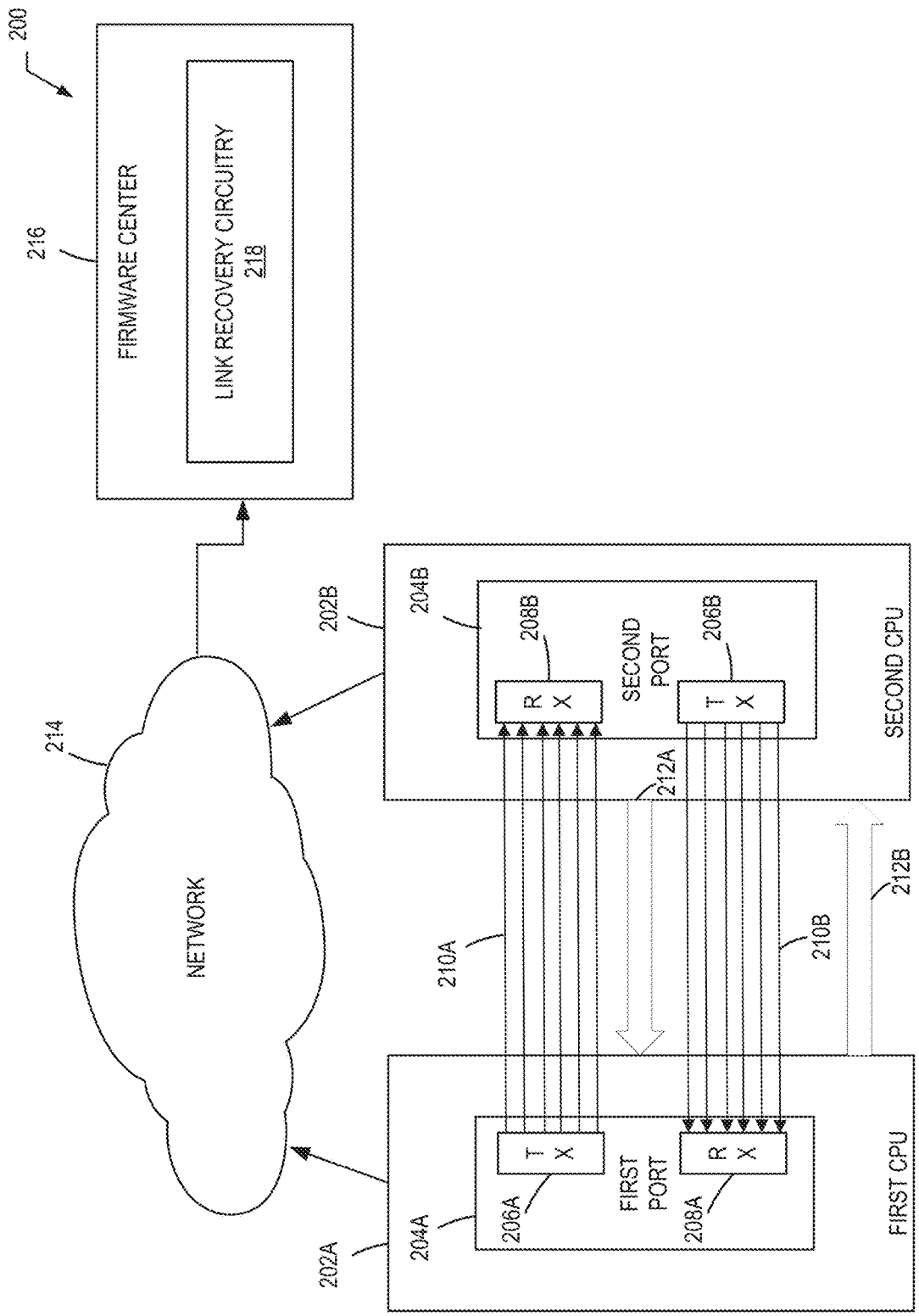
FIG. 2 is a block diagram of an example environment in which the lanes between at least two CPU ports are monitored and recovered during runtime in a firmware center, using link recovery circuitry.

FIG. 2 illustrates an example link recovery system 200 in accordance with the teachings of this disclosure implemented in an example network environment 214. The example network environment 214 includes an example firmware center 216 and an example set of CPUs 202A and 202B. The example firmware center 216 includes an example link recovery circuitry 218.

In some examples, the first and second CPUs, 202A and 202B, may be directly linked to the link recovery circuitry 218, eliminating the need for a network environment 214 and/or a firmware center 216.

In examples disclosed herein, the first and second CPUs, 202A and 202B, have at least one port, 204A and 204B, with transmit (TX) ports, 206A and 206B, and receive (RX) ports, 208A and 208B, connected by a series of links, 210A and 210B, and backchannels, 212A and 212B.

While the example of FIG. 2 communicatively couples components via a network 214, any one or more networks of one or more types may be utilized. For example, the network 214 may be implemented by any combination of local area networks, wide area networks, wired networks, wireless networks, etc.

Figure 3:
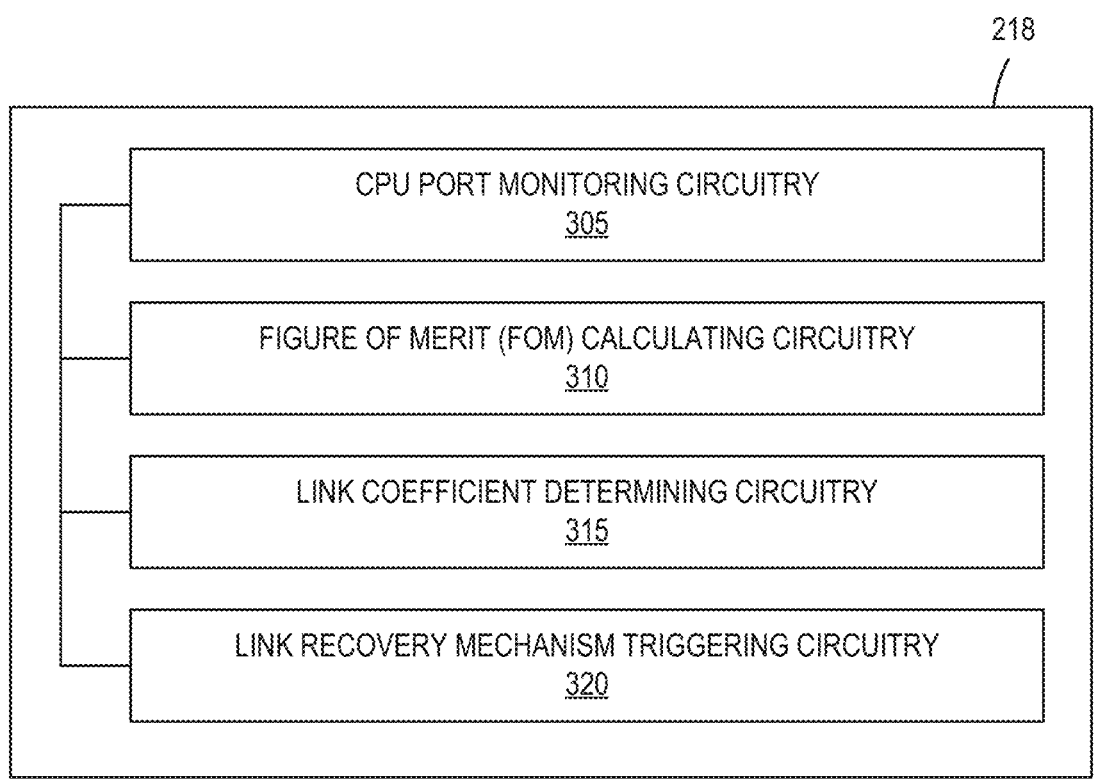
FIG. 3 is a block diagram of an example implementation of the link recovery circuitry of FIG. 2.

FIG. 3 illustrates an example implementation of the link recovery circuitry 218 of FIG. 2, to operate within an example firmware center 216 and in conjunction with at least one of the CPUs 202A and/or 202B via a network 214. The example link recovery circuitry 218 includes an example CPU port monitoring circuitry 305, an example figure of merit (FOM) calculating circuitry 310, an example link coefficient determining circuitry 315, and an example link recovery mechanism triggering circuitry 320.

The example CPU port monitoring circuitry 305 surveils each of the CPU ports to determine whether any uncorrectable errors (UCE) (as measured by correctable errors (CE)) are impending. The example CPU port monitoring circuitry 305 may check for link speed degradation, link width degradation, and/or transaction retry count, etc., to determine an increasement rate for at least one of these metrics, checking to see if any one of the calculated increasement rates are greater than a first threshold value. If any of the calculated increasement rates for correctable errors is greater than the first threshold value, the CPU port is deemed to have an impending uncorrectable error (UCE). In examples disclosed herein, the first threshold value may be different for each type of error and is set based on the type of processor in use.

Additionally, in examples disclosed herein, each CPU port includes a status register and an error counter register, both of which are monitored by the example CPU port monitoring circuitry 305 to check for impending errors and/or to calculate error increasement rates. The CPU port status register indicates the current link width and/or link speed values. The CPU port monitoring circuitry 305 calculates link speed and/or width degradation, transaction retry count, etc. over time, using the values provided by the status register. When an increasement rate (e.g., link speed degradation increasement rate, link width degradation increasement rate, transaction retry count increasement rate, etc.), is determined to be greater than the first threshold value, the CPU port error counter register increments the error count. If the error count within the CPU port error counter register is larger than a second threshold value, it is determined that an uncorrectable error (UCE) is impending, and the CPU port is deemed at risk for failure.

The example figure of merit (FOM) calculating circuitry 310 determines an adaptation result as a figure of merit after the adaptation task has been run on each CPU port lane. In examples disclosed herein, the adaptation task may refer to any transaction such as the retrieval and/or transmission of data, etc., and the adaptation result may refer to a performance metric of that task, etc. For example, an adaptation task for a given CPU port lane may involve the retrieval of data from a specific access point of memory across the CPU port lane, and the associated adaptation result may be the amount of runtime necessary to complete the data retrieval.

The example link coefficient determining circuitry 315 compares the FOM values returned for each of the preset coefficients and evaluates the coefficient that yields the best performance for the CPU, as indicated by the FOM value. In examples disclosed herein, the preset coefficient that produces the highest performance for a CPU port is characterized by having the highest figure of merit (FOM) value in comparison with that of the other preset coefficients.

The example link recovery mechanism triggering circuitry 320 initiates a link recovery process on failing ports. In examples disclosed herein, the Peripheral Component Interconnect Express (PCIe) link training mechanism is used to recover the failing CPU port. The PCIe link training mechanism is a way to configure the two ends of a CPU link, according to preset configuration and hardware connection attributes, to train the link to complete data transactions at a target speed.

In some examples, the CPU port monitoring circuitry 305 of FIG. 3 includes means for determining an impending uncorrectable error on a CPU port. For example, the means for determining an impending UCE on a CPU port may be implemented by CPU port monitoring circuitry 305. In some examples, the CPU port monitoring circuitry 305 may be implemented by machine executable instructions such as that implemented by at least blocks 402, 404 of FIG. 4 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the CPU port monitoring circuitry 305 is implemented by other hardware logic circuitry, hardware implemented state machines, and/or any other combination of hardware, software, and/or firmware. For example, the CPU port monitoring circuitry 305 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the figure of merit (FOM) calculating circuitry 310 of FIG. 3 includes means for calculating the FOM for each preset coefficient across all CPU links. For example, the means for calculating the FOM for each preset coefficient across all CPU links may be implemented by figure of merit (FOM) calculating circuitry 310 In some examples, the figure of merit (FOM) calculating circuitry 310 may be implemented by machine executable instructions such as that implemented by at least blocks 410 of FIG. 4 and blocks 502, 504, 506, 508 from FIG. 5 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the figure of merit (FOM) calculating circuitry 310 is implemented by other hardware logic circuitry, hardware implemented state machines, and/ or any other combination of hardware, software, and/or firmware. For example, the figure of merit (FOM) calculating circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the link coefficient determining circuitry 315 of FIG. 3 includes means for determining the best preset coefficient for high-speed CPU transactions based on FOM yield. For example, the means for determining the best preset coefficient for high-speed CPU transactions based on FOM yield may be implemented by link coefficient determining circuitry 315. In some examples, the link coefficient determining circuitry 315 may be implemented by machine executable instructions such as that implemented by at least blocks 510, 512 of FIG. 5 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the link coefficient determining circuitry 315 is implemented by other hardware logic circuitry, hardware implemented state machines, and/or any other combination of hardware, software, and/or firmware. For example, the link coefficient determining circuitry 315 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the link recovery mechanism triggering circuitry 320 of FIG. 3 includes means for running the PCIe link recovery method using the preset coefficient determined to produce the highest-speed transactions. For example, the means for running the PCIe link recovery method using the preset coefficient determined to produce the highest-speed transactions may be implemented by link recovery mechanism triggering circuitry 320. In some examples, the link recovery mechanism triggering circuitry 320 may be implemented by machine executable instructions such as that implemented by at least block 420 of FIG. 4 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the link recovery mechanism triggering circuitry 320 is implemented by other hardware logic circuitry, hardware implemented state machines, and/or any other combination of hardware, software, and/or firmware. For example, the link recovery mechanism triggering circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the link recovery system 200 of FIG. 2 is illustrated in FIG. 3, one or more of the elements, processes, and/or devices illustrated in FIG. 3 may be combined, divided, re-arranged, omitted, eliminated, and/or implemented in any other way. Further, the example CPU port monitoring circuitry 305, the example figure of merit (FOM) calculating circuitry 310, the example link coefficient determining circuitry 315, the example link recovery mechanism triggering circuitry 320, and/or, more generally, the example link recovery system 200 of FIG. 2, may be implemented by hardware, software, firmware, and/ or any combination of hardware, software, and/or firmware. Thus, for example, any of the example CPU port monitoring circuitry 305, the example figure of merit (FOM) calculating circuitry 310, the example link coefficient determining circuitry 315, the example link recovery mechanism triggering circuitry 320, and/or, more generally, the example link recovery system 200 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example CPU port monitoring circuitry 305, the example figure of merit (FOM) calculating circuitry 310, the example link coefficient determining circuitry 315, the example link recovery mechanism triggering circuitry 320 is/are hereby expressly defined to include a non-transitory computer readable storage device or storage disk such as a memory, a digital versatile disk (DVD), a compact disk (CD), a Blu-ray disk, etc., including the software and/or firmware. Further still, the example link recovery system 200 of FIG. 2 may include one or more elements, processes, and/or devices in addition to, or instead of, those illustrated in FIG. 3, and/or may include more than one of any or all of the illustrated elements, processes and devices.

Figure 4:
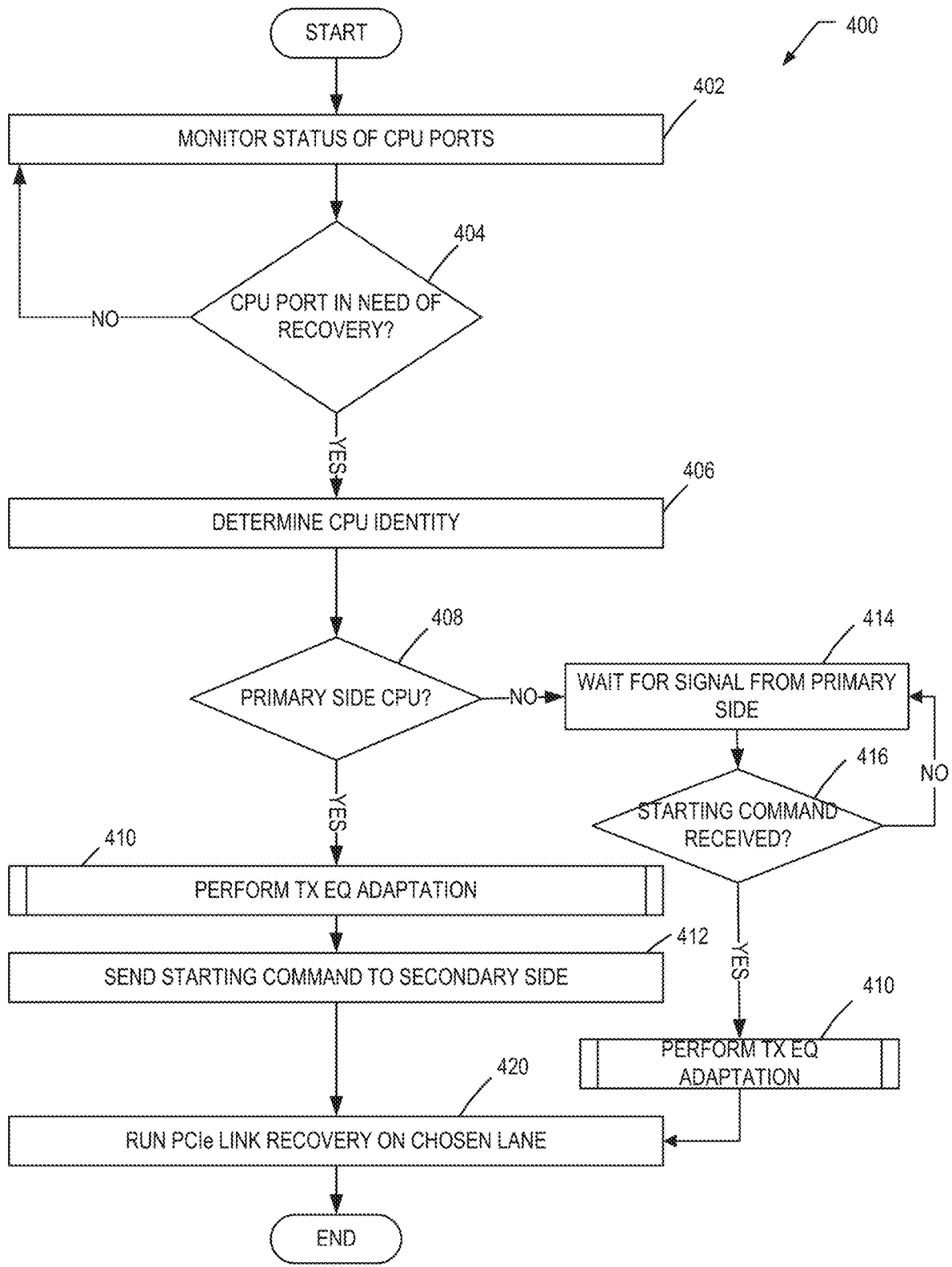
FIGS. 4-5 are flowcharts representative of example machine readable instructions that may be executed by example processor circuitry to implement the example link recovery system of FIGS. 2 and/or 3, in accordance with the teachings of this disclosure.

A flowchart representative of example hardware logic circuitry, machine readable instructions, hardware implemented state machines, and/or any combination thereof for implementing the link recovery circuitry 218 of FIG. 2 is shown in FIG. 4. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example link recovery circuitry 218 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to monitor and determine impending UCEs on CPU ports and trigger link recovery during runtime. The machine readable instructions and/or operations 400 of FIG. 4 begin at block 402, at which the CPU port monitoring circuitry 305 of FIG. 3 begins to surveil the CPU ports for impending errors.

As illustrated in FIG. 4, at block 402, the CPU port monitoring circuitry 305 monitors the CPU ports to establish whether there is any significant rate of increasement of any one or more of transaction retry count, link width degradation, link speed degradation, etc. The count for these correctable errors is stored in the error counter registers associated with each of the CPU ports.

At block 404, the error increasement rate is compared against a second threshold value to establish whether the current rate for each of the CPU port links exceeds the threshold. If the error increasement rate for any given CPU port is greater than the second threshold value, the port is determined to be in need of recovery. If the error increasement rate of the CPU port is less than the second threshold value, the port is deemed to not be in need of recovery. In examples disclosed herein, the second threshold value may be different for each type of error and is set based on the type of processor in use. For example, the threshold value for transaction retry count could be 10 times in 2 seconds. A CPU port experiencing a transaction retry count that is greater than this threshold value would be considered in need of recovery.

At block 406, after a CPU port is determined to be in need of recovery, the identity of the CPU is determined. The identity of a CPU is stored as a node ID associated with each machine, and thus, by retrieving the ID, the CPU in question is determined to be either the primary or secondary side CPU.

At block 410, if the CPU identity was determined to be the primary side in block 408, the TX EQ adaptation flow is initiated. An example process for performing TX EQ adaptation is described in conjunction with FIG. 5.

At block 412, once the primary side CPU has initiated TX EQ adaptation on its ports, a starting command is sent to the secondary side to initiate the same process.

At block 414, the secondary side CPU waits for a signal from the primary side CPU before beginning any processes.

At block 416, if the starting command has been received by the secondary side CPU from the primary side CPU the secondary side may start its TX EQ adaptation process. If the starting signal has not yet been received by the secondary side, the CPU continues to wait for a starting command.

At block 420, once both the primary and secondary side CPUs have finished executing their respective TX EQ adaptation processes, the PCIe link recovery training is run, using the preset coefficient determined to result in the highest-speed transactions, to bring the failing port back to a healthy status.

Figure 5:
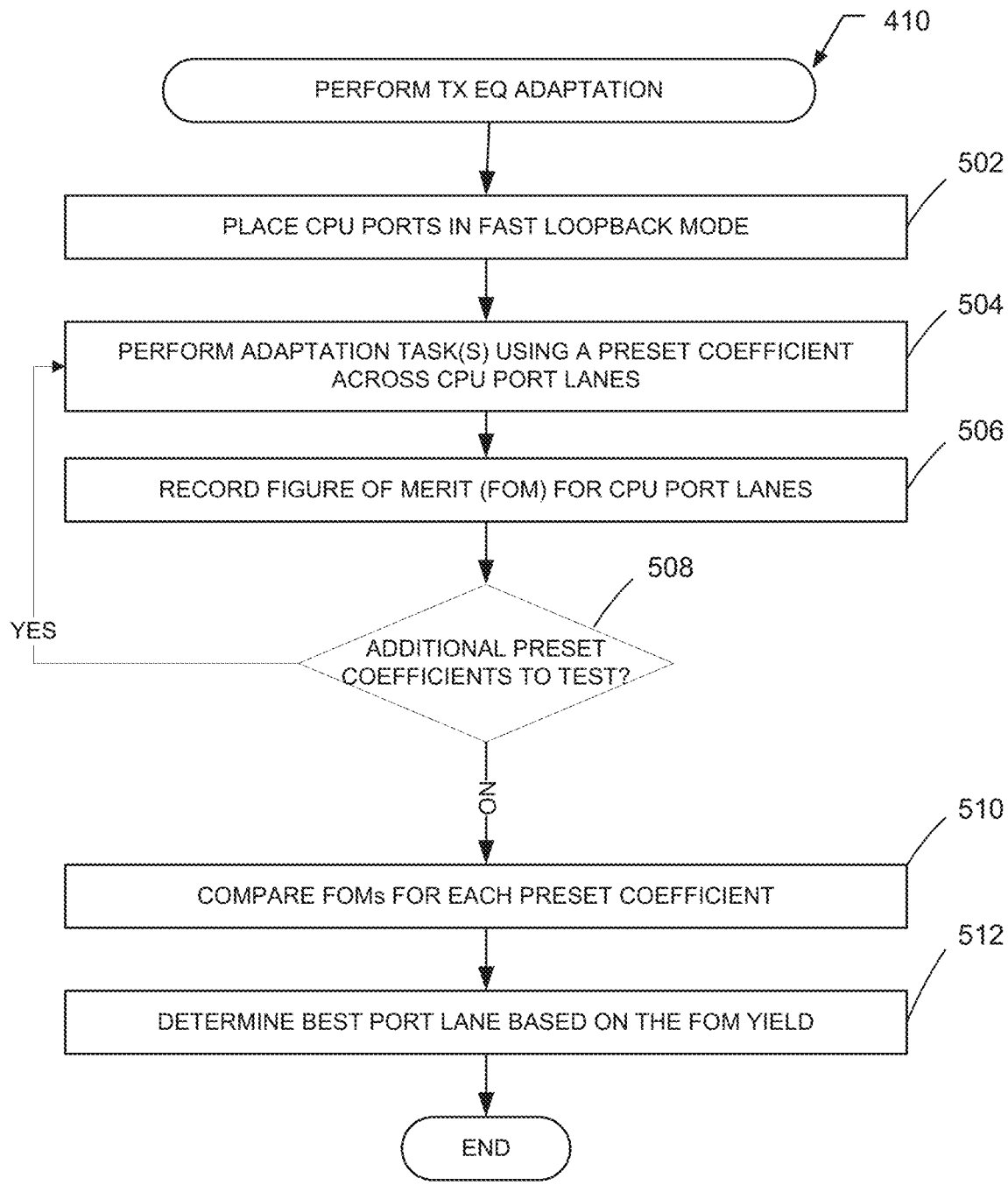

FIG. 5 is a flowchart representative of machine readable instructions which may be executed to implement block 410 of FIG. 4 to perform TX EQ adaptation on CPU port lanes.

As illustrated in FIG. 5, at block 502, all CPU ports are placed in fast loopback mode, which is a specific state that does not produce any traffic on the links between each of the CPU ports, except for the patterns getting the adaptation result.

At block 504, an adaptation task is performed on each of the CPU port lanes using a chosen preset coefficient from the set of 11 total preset coefficients. In examples disclosed herein, an adaptation task may refer to any transaction to test the performance of a CPU port lane, such as a retrieval of data, etc.

At block 506, a figure of merit (FOM), which represents the adaptation result (e.g., time to complete transaction, etc.), is recorded for each adaptation task on the CPU port lanes.

At block 508, if there are more preset coefficients to test out of the 11 total sets of preset coefficients, the adaptation task is run again using one of the outstanding preset coefficients.

At block 510, if all preset coefficients have been determined to be tested, the FOMs for each coefficient is compared and/or ranked.

At block 512, the best preset coefficient is determined based on the FOM yield for each coefficient used for the adaptation task. In examples disclosed herein, the best preset coefficient is determined to be the one that produces the maximum FOM yield.

Figure 6:
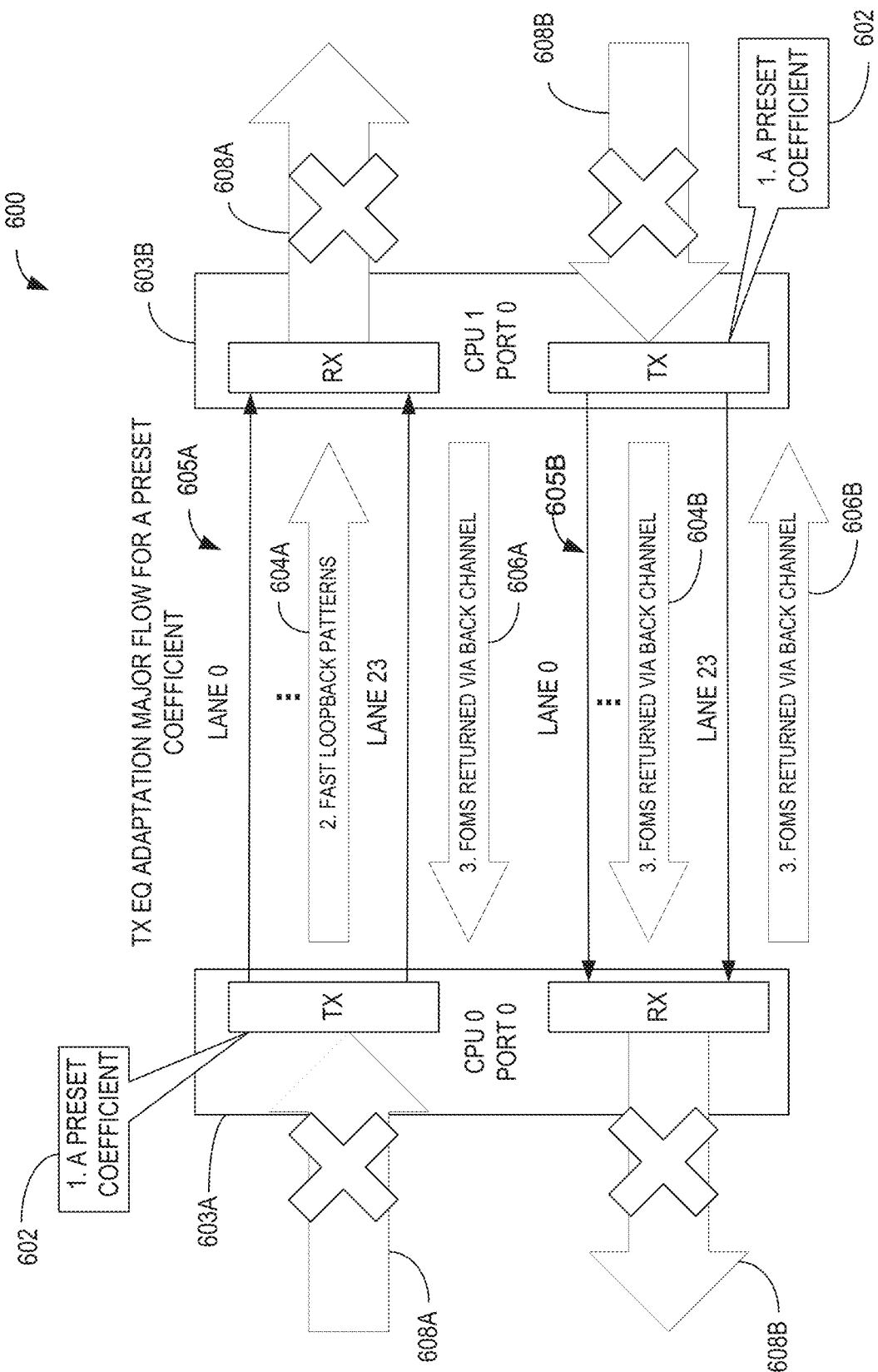
FIG. 6 further illustrates an example implementation of the Transmit Equalization (TX EQ) Adaptation process across several CPU ports, as performed in FIGS. 4 and/or 5.

FIG. 6 illustrates the TX EQ adaptation process being performed on CPU ports. The halting of transactions 608A, 608B to and from the first and second CPU ports 603A and 603B indicate the placement of all CPU ports in fast loopback mode. An adaptation task 604A and 604B is performed on each of the port lanes 605A and 605B using the chosen preset coefficient 602, and the corresponding figures of merit (FOMs) 606A and 606B are returned to the CPU port initiating the transaction for comparison.

Figure 7:
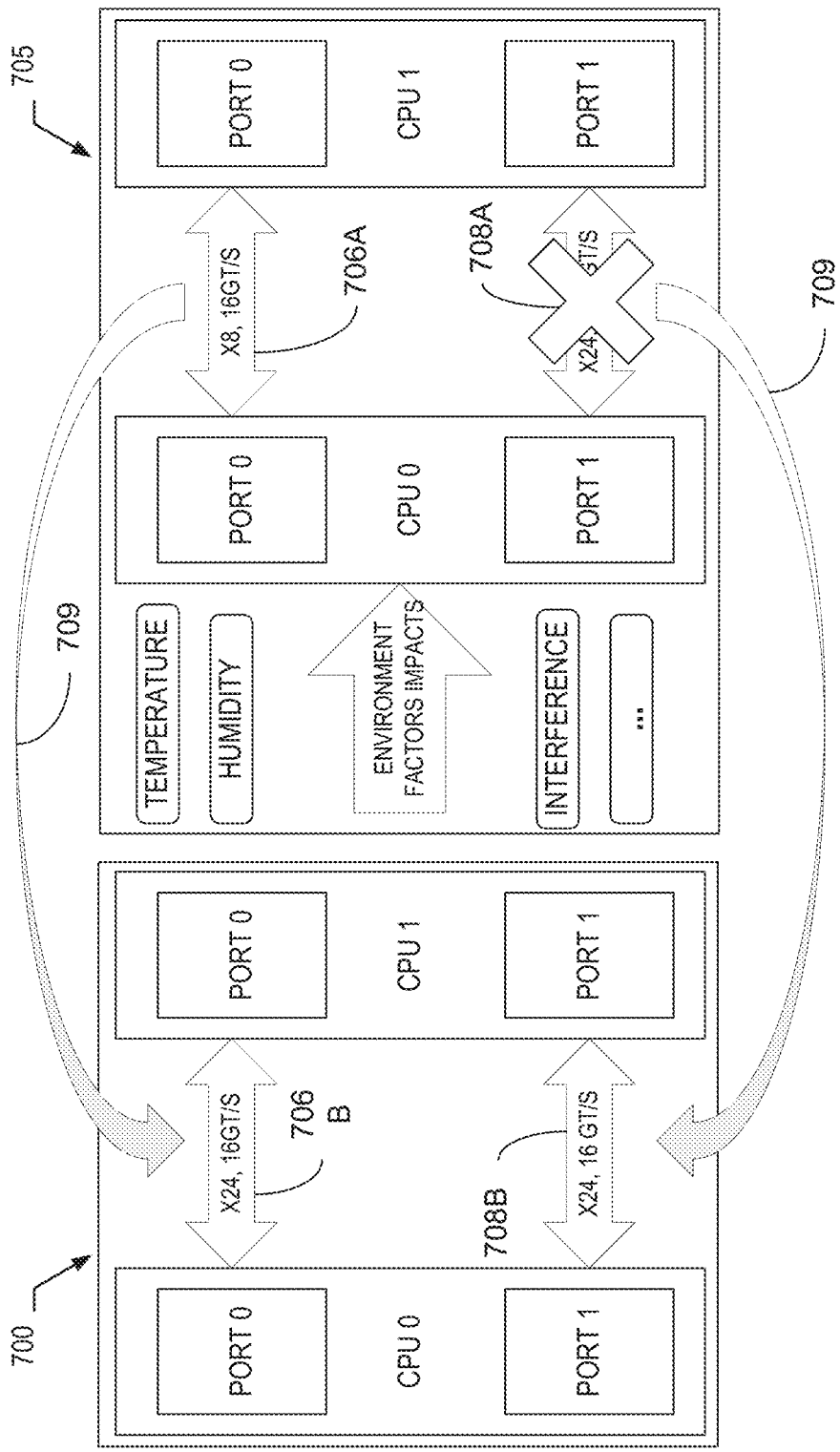
FIG. 7 is a block diagram of an example depiction of the link recovery system of FIG. 2.

FIG. 7 depicts the triggering of link recovery training during runtime on failing and/or failed CPU ports. The example failing CPU port environment 705 depicts a first failing port 706A experiencing both link speed degradation and link width degradation. A second failing port 708A depicts an instance wherein an uncorrectable error (UCE) has occurred. The link recovery mechanism 709 is triggered on the first and second failing lanes 706 and 708, resulting in the example recovered CPU port environment 710. In this recovered CPU port environment 710 exist the first and second recovered lanes 706B and 708B.

Figure 8:
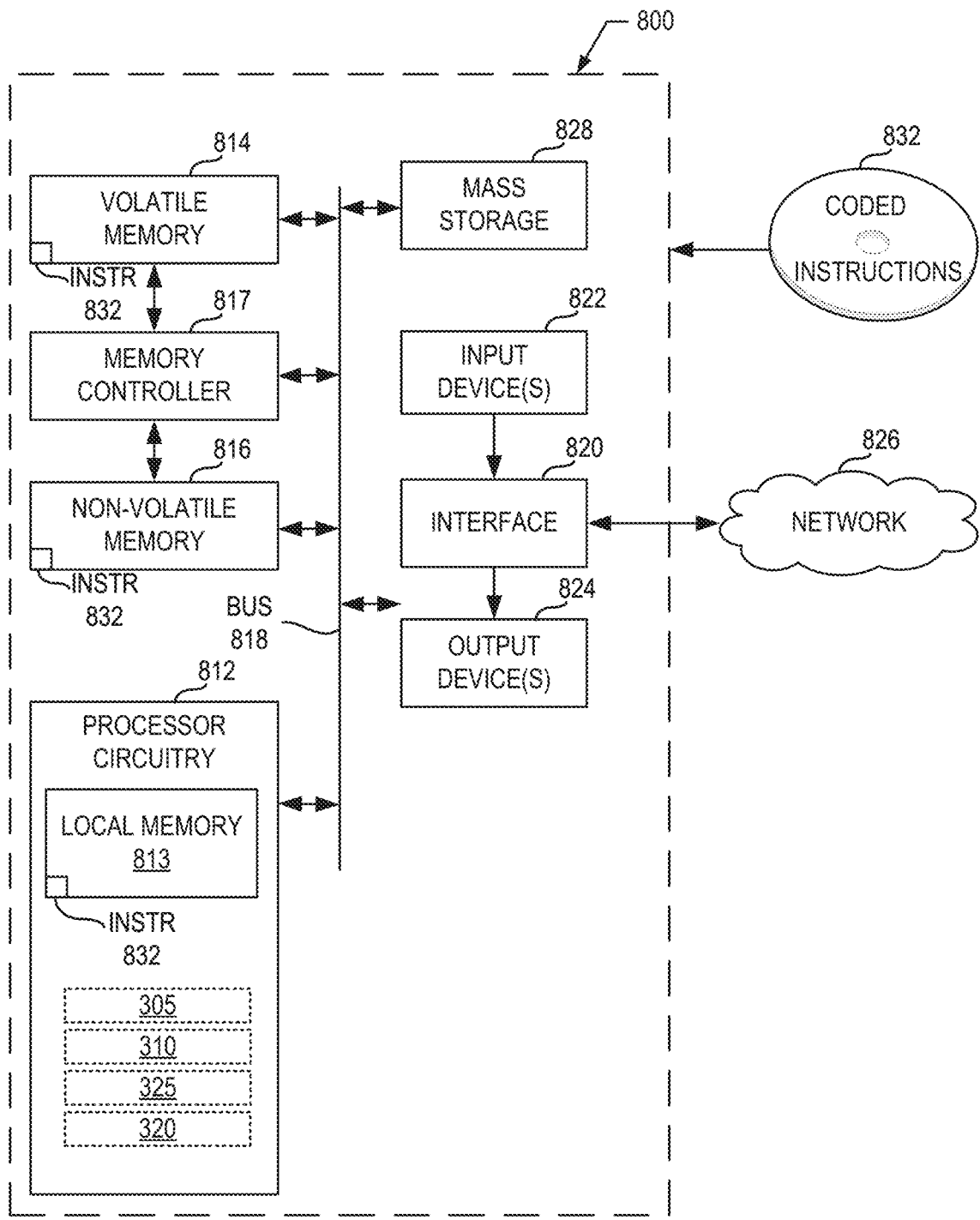
FIG. 8 is a block diagram of an example processing platform including processor circuitry structured to execute the example machine readable instructions of FIGS. 4-5 to implement the link recovery circuitry 218 of FIG. 2.

FIG. 8 is a block diagram of an example processor platform 800 structured to execute and/or instantiate the machine readable instructions and/or operations of FIGS. 4-5 to implement the link recovery system 200 of FIG. 2 The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 825. The processor circuitry 825 of the illustrated example is hardware. For example, the processor circuitry 825 can be implemented by one or more integrated circuits, logic circuits, FPGAs microprocessors, CPUs, GPUs, DSPs, and/or microcontrollers from any desired family or manufacturer. The processor circuitry 825 may be implemented by one or more semiconductor based (e.g., silicon based) devices. In this example, the processor circuitry 825 implements the example CPU port monitoring circuitry 305, the example figure of merit (FOM) calculating circuitry 310, the example link coefficient determining circuitry 315, and the example link recovery mechanism triggering circuitry 320.

The processor circuitry 825 of the illustrated example includes a local memory 805 (e.g., a cache, registers, etc.). The processor circuitry 825 of the illustrated example is in communication with a main memory including a volatile memory 815 and a non-volatile memory 820 by a bus 830. The volatile memory 815 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 820 may be implemented by flash memory and/or any other desired type of memory device. Access to the main memory 815, 820 of the illustrated example is controlled by a memory controller.

The processor platform 800 of the illustrated example also includes interface circuitry 845. The interface circuitry 845 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 840 are connected to the interface circuitry 845. The input device(s) 840 permit(s) a user to enter data and/or commands into the processor circuitry 825. The input device(s) 840 can be implemented by, for example, an audio sensor, a microphone, a camera (still or video), a keyboard, a button, a mouse, a touchscreen, a track-pad, a trackball, an isopoint device, and/or a voice recognition system.

One or more output devices 850 are also connected to the interface circuitry 845 of the illustrated example. The output devices 850 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 845 of the illustrated example, thus, typically includes a graphics driver card, a graphics driver chip, and/or graphics processor circuitry such as a GPU.

The interface circuitry 845 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 810. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 835 to store software and/or data. Examples of such mass storage devices 835 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 4-5, may be stored in the mass storage device 835, in the volatile memory 815, in the non-volatile memory 820, and/or on a removable non-transitory computer readable storage medium such as a CD or DVD.

Figure 9:
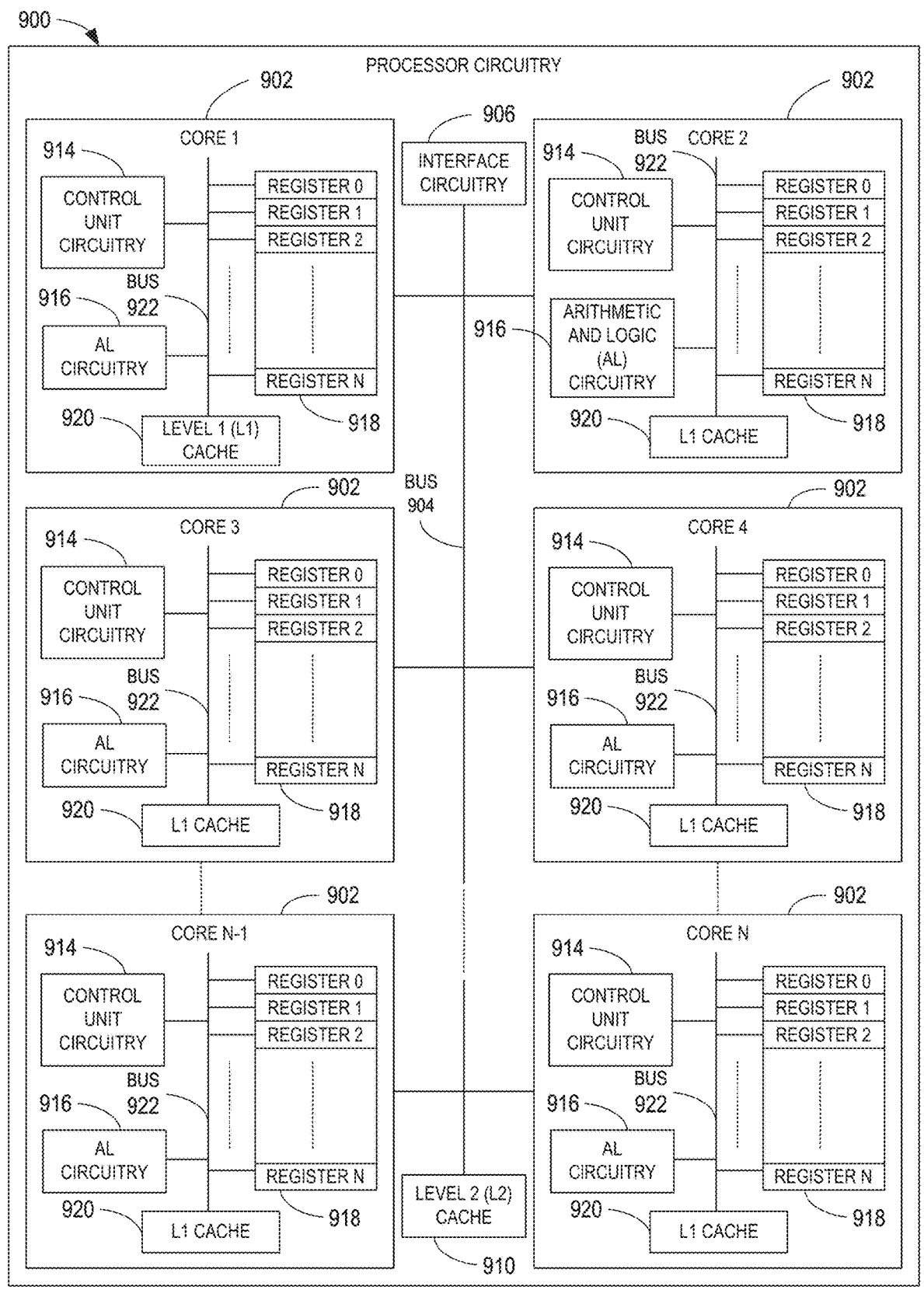
FIG. 9 is a block diagram of an example implementation of the processor circuitry of FIG. 8.

FIG. 9 is a block diagram of an example implementation of the processor circuitry 825 of FIG. 8. In this example, the processor circuitry 825 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIGS. 4-5.

The cores 902 may communicate by an example first bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 815, 820 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
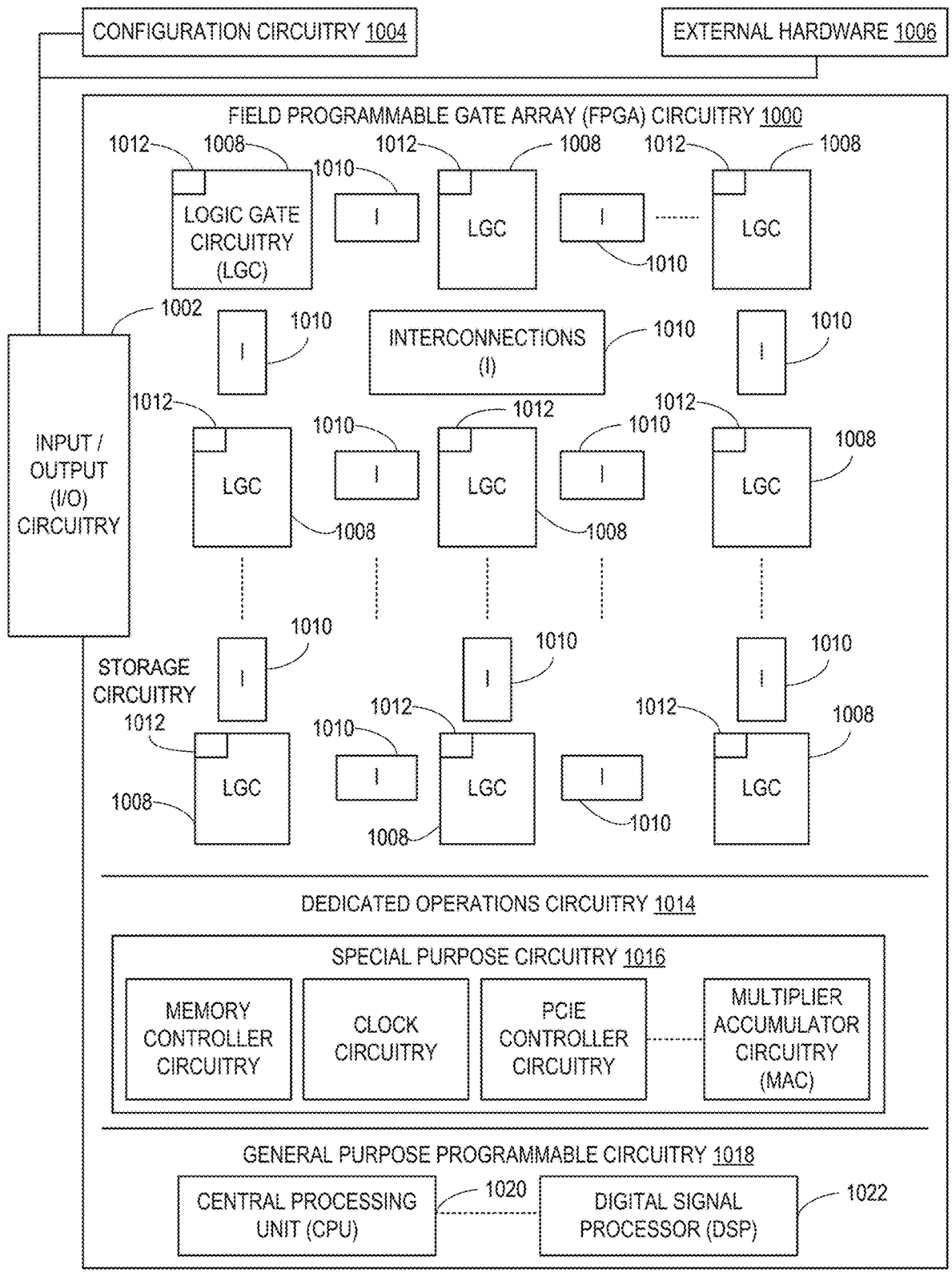
FIG. 10 is a block diagram of another example implementation of the processor circuitry of FIG. 8.

FIG. 10 is a block diagram of another example implementation of the processor circuitry 825 of FIG. 8. In this example, the processor circuitry 825 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 4-5 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 4-5 In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 4-5 As such, the FPGA circuitry 1000 may be structured to effectively instantiate some or all of the machine readable instructions of the flowcharts of FIGS. 4-5 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 4-5 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 4-5 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 825 of FIG. 8, many other approaches are contemplated. For example, as mentioned above, modern FPGA circuitry may include an on-board CPU, such as one or more of the example CPU 1020 of FIG. 10. Therefore, the processor circuitry 825 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 4-5 may be executed by one or more of the cores 902 of FIG. 9 and a second portion of the machine readable instructions represented by the flowcharts of FIGS. 4-5 may be executed by the FPGA circuitry 1000 of FIG. 10.

In some examples, the processor circuitry 825 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 825 of FIG. 8, which may be in one or more packages. For example, the XPU may include a CPU in one package, a DSP in another package, a GPU in yet another package, and an FPGA in still yet another package.

Figure 11:
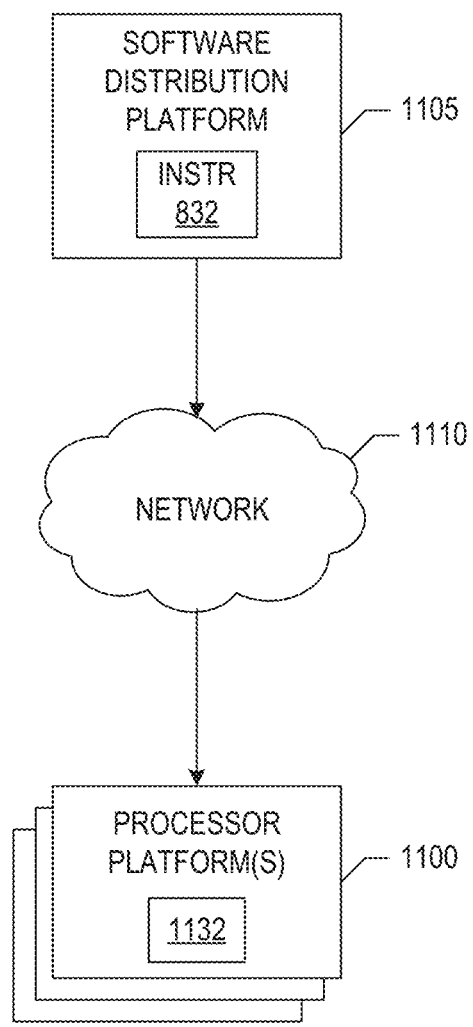
FIG. 11 is a block diagram of an example software distribution platform (e.g., one or more servers) to distribute software (e.g., software corresponding to the example machine readable instructions of FIGS. 4-5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 1132 of FIG. 11 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions represented by the flowcharts of FIGS. 4-5. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 1132, which may correspond to the example machine readable instructions represented by the flowcharts of FIGS. 4-5, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1105. For example, the software, which may correspond to the example machine readable instructions represented by the flowcharts of FIGS. 4-5 may be downloaded to the example processor platform 1100, which is to execute the machine readable instructions 1132 to implement the link recovery system 200 of FIG. 2. In some example, one or more servers of the software distribution platform 1105 periodically offer, transmit, and/or force updates to the software (e.g., the example machine readable instructions 1132 of FIG. 11) to ensure improvements, patches, updates, etc., are distributed and applied to the software at the end user devices.

Example methods, apparatus, systems, and articles of manufacture to perform runtime recovery of processor links are disclosed herein. Further examples and combinations thereof include the following:

Example 1 includes a non-transitory computer readable medium comprising instructions that, when executed, cause a machine to at least determine an onset of an error based on health of a central processor unit (CPU) port, calculate a figure of merit (FOM) yield for each of a plurality of adaptation tasks performed on a lane of the CPU port using a first preset coefficient of a plurality of preset coefficients, select a preset coefficient based on the calculated FOM, and trigger a link recovery mechanism, using the selected preset coefficient to initiate a link recovery process on the CPU port.

Example 2 includes the non-transitory computer readable medium of example 1, wherein the health of a CPU port is monitored using a status register and an error counter register and the error is an uncorrectable error (UCE).

Example 3 includes the non-transitory computer readable medium of example 2, wherein the status register is to measure any one or more of a link speed, link width, and transaction retry count of the CPU port.

Example 4 includes the non-transitory computer readable medium of example 2, wherein the error counter register is to increment a counter when any one or more increasement rate of a link speed degradation, link width degradation, or transaction retry count is greater than a threshold value.

Example 5 includes the non-transitory computer readable medium of example 4, wherein the increasement rate is calculated by measuring the difference between a first link speed and a second link speed, divided by a time interval.

Example 6 includes the non-transitory computer readable medium of example 1, wherein the FOM yield is equal to a runtime of an adaptation task of the plurality of adaptation tasks.

Example 7 includes the non-transitory computer readable medium of any one of examples 1 and 5, wherein the plurality of adaptation tasks is performed on the lane of the CPU port using a second preset coefficient of a plurality of preset coefficients.

Example 8 includes the non-transitory computer readable medium of example 1, wherein the selected preset coefficient is determined by the greatest calculated FOM.

Example 9 includes the non-transitory computer readable medium of example 1, wherein the link recovery mechanism performed on the CPU port is a Peripheral Component Interconnect Express link training (PCIe) link training mechanism.

Example 10 includes a method to perform runtime recovery of processor links comprising determining an onset of an error based on health of a central processor unit (CPU) port, calculating a figure of merit (FOM) yield for each of a plurality of adaptation tasks performed on a lane of the CPU port using a first preset coefficient of a plurality of preset coefficients, selecting a preset coefficient based on the calculated FOM, and triggering a link recovery mechanism, using the selected preset coefficient to initiate a link recovery process on the CPU port.

Example 11 includes the method of example 10, wherein the health of a CPU port is monitored using a status register and an error counter register and the error is an uncorrectable error (UCE).

Example 12 includes the method of example 11, wherein the status register is to measure any one or more of a link speed, link width, and transaction retry count of the CPU port.

Example 13 includes the method of example 11, wherein the error counter register is to increment a counter when any one or more increasement rate of a link speed degradation, link width degradation, or transaction retry count is greater than a threshold value.

Example 14 includes the method of example 10, wherein the FOM yield is equal to a runtime of an adaptation task of the plurality of adaptation tasks.

Example 15 includes the method of any one of examples 10 and 14, wherein the plurality of adaptation tasks is performed on the lane of the CPU port using a second preset coefficient of a plurality of preset coefficients.

Example 16 includes the method of example 10, wherein the selected preset coefficient is determined by the greatest calculated FOM.

Example 17 includes the method of example 10, wherein the link recovery mechanism performed on the CPU port is a Peripheral Component Interconnect Express link training (PCIe) link training mechanism.

Example 18 includes an apparatus to perform runtime recovery of processor links comprising interface circuitry, processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations or the third operations to instantiate central processing unit (CPU) port monitoring circuitry to surveil a CPU port to determine whether any uncorrectable errors (UCE) are impending, figure of merit (FOM) calculating circuitry to determine a FOM yield of an adaptation task that is run on a lane of a failing CPU port using a preset coefficient, link coefficient determining circuitry to establish a selected preset coefficient that yields the best performance for the CPU, as indicated by the FOM yield, and link recovery mechanism triggering circuitry to initiate a link recovery process on the failing CPU port.

Example 19 includes the apparatus of example 18, wherein the CPU port monitoring circuitry is to further monitor the health of a CPU port using a status register and an error counter register and the error is an uncorrectable error (UCE).

Example 20 includes the apparatus of example 19, wherein the status register is to measure any one or more of a link speed, link width, and transaction retry count of the CPU port.

Example 21 includes the apparatus of example 119, wherein the error counter register is to increment a counter when any one or more increasement rate of a link speed degradation, link width degradation, or transaction retry count is greater than a threshold value.

Example 22 includes the apparatus of example 17, wherein the FOM yield is equal to a runtime of the adaptation task.

Example 23 includes the apparatus of any one of examples 18 and 22, wherein the plurality of adaptation tasks is performed on the lane of the CPU port using a second preset coefficient of a plurality of preset coefficients.

Example 24 includes the apparatus of example 18, wherein the selected preset coefficient is determined by the greatest calculated FOM.

Example 25 includes the apparatus of example 18, wherein the link recovery mechanism performed on the CPU port is a Peripheral Component Interconnect Express link training (PCIe) link training mechanism.

From the foregoing, it will be appreciated that example systems, methods, apparatus, and articles of manufacture have been disclosed that monitor the health of CPU ports and trigger a link recovery routine on failing and/or failed ports during runtime.

The disclosed systems, methods, apparatus, and articles of manufacture improve the efficiency of using a computing device by reducing the number of system crashes by predicted and handling uncorrectable errors (UCEs) during runtime. The unpredictable onset of UCE results in a failure to complete any pending transactions. If an unfinished transaction is deemed critical (i.e., it cannot be ignored by the source), the system will crash, resulting in a potential loss of important data and a need for a system restart to regain functionality. The ability to predict and appropriately handle UCEs during runtime reduces the possibility of this type of system crash, resulting in less data loss and more efficient computing. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable medium comprising instructions that, when executed, cause a machine to at least:
   determine an onset of an error based on health of a central processor unit (CPU) port;
   calculate a figure of merit (FOM) yield for a plurality of adaptation tasks performed on a lane of the CPU port using a first preset coefficient of a plurality of preset coefficients;
   select a preset coefficient based on the calculated FOM yield; and
   trigger a link recovery mechanism, using the selected preset coefficient to initiate a link recovery process on the CPU port.

2. The non-transitory computer readable medium of claim 1, wherein the health of a CPU port is monitored using a status register and an error counter register and the error is an uncorrectable error (UCE).

3. The non-transitory computer readable medium of claim 2, wherein the status register is to measure any one or more of a link speed, link width, and transaction retry count of the CPU port.

4. The non-transitory computer readable medium of claim 2, wherein the error counter register is to increment a counter when any one or more increasement rate of a link speed degradation, link width degradation, or transaction retry count is greater than a threshold value.

5. The non-transitory computer readable medium of claim 4, wherein the increasement rate is calculated by measuring a difference between a first link speed and a second link speed, divided by a time interval.

6. The non-transitory computer readable medium of claim 1, wherein the FOM yield is equal to a runtime of an adaptation task of the plurality of adaptation tasks.

7. The non-transitory computer readable medium of claim 1, wherein the plurality of adaptation tasks is performed on the lane of the CPU port using a second preset coefficient of a plurality of preset coefficients.

8. The non-transitory computer readable medium of claim 1, wherein the selected preset coefficient is determined by the greatest calculated FOM.

9. The non-transitory computer readable medium of claim 1, wherein the link recovery mechanism performed on the CPU port is a Peripheral Component Interconnect Express link training (PCIe) based link training mechanism.

10. A method to perform runtime recovery of processor links comprising:
    determining an onset of an error based on health of a central processor unit (CPU) port;
    calculating a figure of merit (FOM) yield for a plurality of adaptation tasks performed on a lane of the CPU port using a first preset coefficient of a plurality of preset coefficients;
    selecting a preset coefficient based on the calculated FOM yield; and
    triggering a link recovery mechanism, using the selected preset coefficient to initiate a link recovery process on the CPU port.

11. The method of claim 10, wherein the health of a CPU port is monitored using a status register and an error counter register and the error is an uncorrectable error (UCE).

12. The method of claim 11, wherein the status register is to measure any one or more of a link speed, link width, and transaction retry count of the CPU port.

13. The method of claim 11, wherein the error counter register is to increment a counter when any one or more increasement rate of a link speed degradation, link width degradation, or transaction retry count is greater than a threshold value.

14. The method of claim 10, wherein the FOM yield is equal to a runtime of an adaptation task of the plurality of adaptation tasks.

15. The method of claim 10, wherein the plurality of adaptation tasks is performed on the lane of the CPU port using a second preset coefficient of a plurality of preset coefficients.

16. The method of claim 10, wherein the selected preset coefficient is determined by the greatest calculated FOM.

17. The method of claim 10, wherein the link recovery mechanism performed on the CPU port is a Peripheral Component Interconnect Express link training (PCIe) based link training mechanism.

18. An apparatus to perform runtime recovery of processor links comprising:
   interface circuitry;
   machine readable instructions; and
   programmable circuitry to at least one of instantiate or execute the machine readable instructions to:
   surveil a central processing unit (CPU) port to determine whether any uncorrectable errors (UCE) are impending;
   determine a figure of merit (FOM) yield of an adaptation task that is run on a lane of a failing CPU port using a preset coefficient;
   establish a selected preset coefficient that yields the best performance for the CPU, as indicated by the FOM yield; and
   initiate a link recovery process on the failing CPU port.

19. The apparatus of claim 18, wherein the programmable circuitry is to monitor health of a CPU port using a status register and an error counter register.

20. The apparatus of claim 19, wherein the error counter register is to increment a counter when any one or more increasement rate of a link speed degradation, link width degradation, or transaction retry count is greater than a threshold value.

* * * * *